UNITED STATES PATENT OFFICE.

JULIAN SEGURA, OF NEW YORK, N. Y.

SOLDER FOR ALUMINUM.

1,328,694.

Specification of Letters Patent. Patented Jan. 20, 1920.

No Drawing. Application filed October 21, 1919. Serial No. 332,321.

*To all whom it may concern:*

Be it known that I, JULIAN SEGURA, a subject of the King of Spain, residing at No. 242 West 56th street, in the city, county, and State of New York, have invented certain new and useful Improvements in Solder for Aluminum; and I do hereby declare the following to be a full, clear, and exact description of the invention, such as will enable others skilled in the art to which it appertains to make and use the same.

My invention relates to improvements in soldering aluminum and particularly to a solder of such a character that the plates or sheets of aluminum soldered by it will be united by an extremely strong bond, of such a character that the joint will successfully resist extraordinary tensile and bending strains.

The ingredients of my improved solder are lead, tin, zinc, antimony and white metal. The preferred composition of the white metal is 88.9 parts by weight of tin, 7.4 parts by weight of antimony, and 3.7 parts by weight of copper, so that by the use of white metal in the solder I have a ready means of introducing copper into it. As is well known, in white metal, the tin has a range of from 80 to 90%, antimony from 5 to 15%, and copper from 3 to 10%.

The preferred proportions, by weight of the solder are as follows: 90 parts by weight of lead; 195 parts by weight of tin; 190 parts by weight of zinc; 10 parts by weight of antimony and 15 parts by weight of white metal.

Some latitude may, however, be tolerated in compounding the solder; thus, for instance, the proportions by weight may vary as follows: lead 75 to 95 parts, tin 185 to 205 parts, zinc 185 to 205 parts, antimony 5 to 20 parts, white metal 5 to 25 parts.

In applying the solder to the aluminum parts to be united, care must be taken to energetically scrub the surfaces of the aluminum of the intended joint with a stiff metal brush so as to clear the surfaces entirely from outside. The soldering may then be effected, by a soldering iron and the solder in the usual manner known to the soldering art.

Having thus described my invention, what I claim is:

1. A solder for aluminum composed of lead ranging from 75 to 95 parts; tin ranging from 185 to 205 parts; zinc ranging from 185 to 205 parts; antimony ranging from 5 to 20 parts and white metal ranging from 5 to 25 parts (the composition of the white metal ranging from 80 to 90% tin, 5 to 15% antimony, and 3 to 10% copper).

2. A solder for aluminum consisting of 90 parts of lead; 195 parts of tin; 190 parts of zinc; 10 parts of antimony and 15 parts of white metal (the composition of the white metal ranging from 80 to 90% tin, 5 to 15% antimony and 3 to 10% copper).

In testimony whereof I affix my signature.

JULIAN SEGURA.